Patented June 12, 1934

1,962,808

UNITED STATES PATENT OFFICE 1,962,808

COMPOUNDED ADHESIVES AND METHOD OF MAKING

Charles N. Cone and Earl D. Brown, Seattle, Wash., assignors to I. F. Laucks, Inc., Seattle, Wash., a corporation of Washington No Drawing. Application March 5, 1930, Serial No. 433,521

9 Claims. (Cl. 87—17)

Casein adhesives, while favored by some manufacturers on account of their ultimate results, are however, beset by the drawback of tending to foam badly on the mixing up with water, this occasioning more or less difficulty even with efficient mixing machinery; also excessive gelling is prone to occur with certain reagents. In accordance with the present invention, however, these disadvantages can be readily obviated, and at the same time an adhesive may be had which furthermore exhibits much better strength and water resistance than ordinary casein adhesives.

To the accomplishment of the foregoing and related ends, the invention, then, consists of the features hereinafter fully described, and particularly pointed out in the claims, the following description setting forth in detail certain illustrative embodiments of the invention, these being indicative however of but a few of the various ways in which the principle of the invention may be employed.

By casein is meant the protein substance precipitated from milk. Several commercial detailed processes for this are known, predominant among which is the acid precipitation. Any of the obtainable or commercial caseins are contemplated within the purview of the present invention. With such a casein, we incorporate a vegetable protein in the form of an isolated protein, as distinguished from a whole flour containing carbohydrates and other seed materials. Such vegetable protein may be prepared from oleaginous seeds, such as soya bean, peanut, castor bean, linseed, cottonseed, tung nuts, etc., and the particular manner of preparing is not material, so long as the protein is substantially freed from carbohydrates. For instance, an oleaginous seed, such as mentioned, may be ground, preferably the oil having been eliminated; and in fact an oil seed cake or residue from oil extraction is a highly advantageous form of raw material. The ground seed or flour is treated with any suitable reagents increasing the solubility of the protein, for instance alkaline solutions, such as solutions of sodium sulphite, calcium hydroxide, sodium hydroxide, etc., and from the liquor-extract the protein may be separated by precipitating, by bringing the hydrogen ion concentration to a point near the iso-electric point of the protein, which is about pH 4.5 for instance by adding an acid, such as sulphuric acid. The protein precipitated as a curd may then be washed and be disintegrated if desired, and may then be mixed with casein, or the vegetable protein may be dried and ground, and in the powder form be mixed if preferred. There is also incorporated a salt of an alkali metal, and an alkaline-earth hydroxide. For example, casein and vegetable protein may be combined in proportions of about 60% casein and 40% of the vegetable protein, and to such adhesive base lime and sodium fluoride are added in the proportions of about 500 parts of the adhesive base, 95 parts of hydrated lime, and 74 parts of sodium fluoride, by weight. Desirably, the lime and alkali metal salt may be proportioned to yield an equivalent of about 12% caustic soda and 6% free lime as referred to the total protein. On mixing up with water, as in gluing practice, the difficulties from lumping normally characteristic of casein are obviated, and the water requirement of such a composition is found for instance to be about 2.24 and the viscosity after half an hour about 23. By water requirement is meant the ratio of water to the dry adhesive required to attain a desired character of spreadable liquid. By comparison, an all casein adhesive shows a water requirement of about 2.00 and a viscosity after half an hour of about 23. On the other hand, an all vegetable protein adhesive may show a water requirement of 3.36, and a viscosity after half an hour of 15. The calculated mathematical water requirement for the aforementioned casein and vegetable protein composition is 2.54. Thus quite surprisingly, the casein and vegetable protein composition is pointedly different from what would a priori be expected. In fact, with different proportions of casein and the vegetable protein it is found that the water ratio runs different and lower than what would be expected and the viscosity number as taken for instance on a MacMichael viscosimeter is also found to be much different from that of the vegetable protein alone, particularly as affecting the time-viscosity behavior, i. e. the viscosity after half an hour, or other standard period. The importance of this lies in the fact that in practical use an adhesive must make up with a viscosity between certain limits. It must be neither too thick nor too thin in its consistency, to be amenable to plant usage, and furthermore, since a batch once made up with water is not ordinarily used up quickly, much change in viscosity is objectionable. In order that an adhesive have a satisfactory time-viscosity factor it must remain within the limits of satisfactory viscosity during the period between making up and its final application. In the case of a wood working plant this may be several hours. A casein glue tends to thicken up on standing. The present invention also corrects this tendency.

Compositions of casein and vegetable protein, for instance soya bean protein, peanut protein, cottonseed protein, etc., are thus characterized by an unexpectedly low water requirement number and an excellent time-viscosity factor besides having much better strength and water resistance than adhesives made with casein alone. The total characteristics are all the more surprising in view of the relatively long experience with compositions of casein and vegetable seed flours. Just why there should be such differences between the isolated vegetable protein and the whole flour is not entirely clear. The absence of carbohydrates and other constitutents may be a factor and again a vegetable protein as isolated and suitably prepared appears to be quite reactive chemically. Interaction of proteins is a known possibility in other fields of protein chemistry.

Besides being applicable to gluing usages, plywood plants, etc., the improved adhesive base is also highly advantageous in sizing and as a carrier for mineral substances, clay, satin white, etc., in the coating of paper, the water requirement number and the viscosity factor again being desirable. For example, a composition of 50% casein and 50% vegetable protein from soya bean may be employed as a base, and to about 38.8 parts thereof there may be added about 1.2 parts of sodium carbonate, 1.6 parts of trisodium phosphate, 0.4 parts of sodium fluoride, 2.7 parts of borax, 0.8 parts of aqueous ammonia, 150 parts of clay, 50 parts of satin white, and 314 parts of water. The viscosity of the adhesive base itself, running about 27, compares with a viscosity of about 28 for an all casein base and about 62 for an all vegetable protein base. This again recalls the fact that the the properties of the blend are not additive, but are distinctive from either of the components. A further very important characteristic of this blend is its resistance to foaming as contrasted with casein alone. This is of particular importance with sizing and coating, since foaming in a coating plant occasions much trouble and where the mix contains foam the bubbles result in "pin holes" in the product.

These characteristics of casein and vegetable protein blends may be had with the vegetable protein prepared pure in various ways and from various seeds and with various relative proportions, and other modes of employing the principle of the invention may be employed, change being made as regards the details illustratively set forth, provided the features stated in any of the following claims, or the equivalent of such, be employed.

We therefore particularly point out and distinctly claim as our invention:—

1. An adhesive base readily dispersible without objectionable lumping and with low water-requirement when mixed to spreading consistency, comprising animal casein, and an isolated vegetable protein.

2. An adhesive base readily dispersible without objectionable lumping and with low water-requirement when mixed to spreading consistency, comprising animal casein, an isolated vegetable protein, and an alkaline agent.

3. An adhesive base readily dispersible without objectionable lumping and with low water-requirement when mixed to spreading consistency, comprising animal casein, an isolated vegetable protein, lime, and a salt of sodium reactable to yield caustic soda and free lime.

4. An adhesive base readily dispersible without objectionable lumping and with low water-requirement when mixed to spreading consistency, comprising animal casein, and isolated soya bean protein.

5. An adhesive base readily dispersible without objectionable lumping and with low water-requirement when mixed to spreading consistency, comprising animal casein, isolated soya bean protein, and an alkaline agent.

6. An adhesive base readily dispersible without objectionable lumping and with low water-requirement when mixed to spreading consistency, comprising animal casein, isolated soya bean protein, lime, and a salt of sodium reactable to yield caustic soda and free lime.

7. An adhesive comprising a mixture of casein and an isolated vegetable protein, hydrated lime, sodium fluoride and water.

8. An adhesive comprising about 500 parts of a mixture of casein and an isolated vegetable protein, about 95 parts of hydrated lime, about 74 parts of sodium fluoride and water.

9. An adhesive comprising about 500 parts of a mixture of casein and an isolated vegetable protein, said casein being present in an amount equal to approximately 60% of said mixture, about 95 parts of hydrated lime, about 74 parts of sodium fluoride and water, said water being present in an amount equal to approximately 2.24 times the total weight of said mixture, said lime and said fluoride.

CHARLES N. CONE.
EARL D. BROWN.